United States Patent
McLaughlin

(10) Patent No.: US 8,781,125 B2
(45) Date of Patent: Jul. 15, 2014

(54) SYSTEMS AND METHODS OF SECURE CODING FOR PHYSICAL LAYER COMMUNICATION CHANNELS

(75) Inventor: Steven William McLaughlin, Decatur, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 1486 days.

(21) Appl. No.: 12/044,411

(22) Filed: Mar. 7, 2008

(65) Prior Publication Data

US 2008/0219447 A1  Sep. 11, 2008

Related U.S. Application Data

(60) Provisional application No. 60/893,998, filed on Mar. 9, 2007.

(51) Int. Cl.
H04K 1/00 (2006.01)
H04K 1/02 (2006.01)
H04L 9/00 (2006.01)

(52) U.S. Cl.
CPC .. H04K 1/00 (2013.01); H04K 1/02 (2013.01); H04L 9/00 (2013.01); H04L 9/002 (2013.01)
USPC ............................ 380/270; 380/255; 713/151

(58) Field of Classification Search
CPC ........................................................ H04K 1/00
USPC ........................................................ 709/223
See application file for complete search history.

(56) References Cited

PUBLICATIONS

Barros et al., "Secrecy Capacity of Wireless Channels", Jun. 2006, pp. 1-5.*
Gerard Cohen et al., "Generalized coset schemes for the wire-tap channel: Application to biometrics", 2004, p. 1.*
Rohit et al., "Secret Communication using Artificial Noise", 2005, pp. 1-5.*

* cited by examiner

*Primary Examiner* — Andrew Goldberg
(74) *Attorney, Agent, or Firm* — Nelson Mullins Riley & Scarborough LLP

(57) ABSTRACT

Systems and methods of securely communicating from a sender device to a receiver device on a communication channel are disclosed. One disclosed method is for securely communicating from a sender device to a receiver device on a main channel when an eavesdropper device is listening on an eavesdropper channel. The main channel has an signal-to-noise ratio $SNR_M$, and the eavesdropper channel has a signal-to-noise ratio $SNR_E$. The method comprises encoding a message at a physical layer with a secure error correcting code (SECC) to produce an encoded message, and transmitting the encoded message on the main channel. The SECC has a set of defined characteristics such that when the eavesdropper device is more than a predetermined distance Z from the sender, at least a predefined fraction of the message is unreliable, where the predefined fraction of unreliable bits renders the eavesdropper unable to reliable decode messages on the main channel.

23 Claims, 16 Drawing Sheets

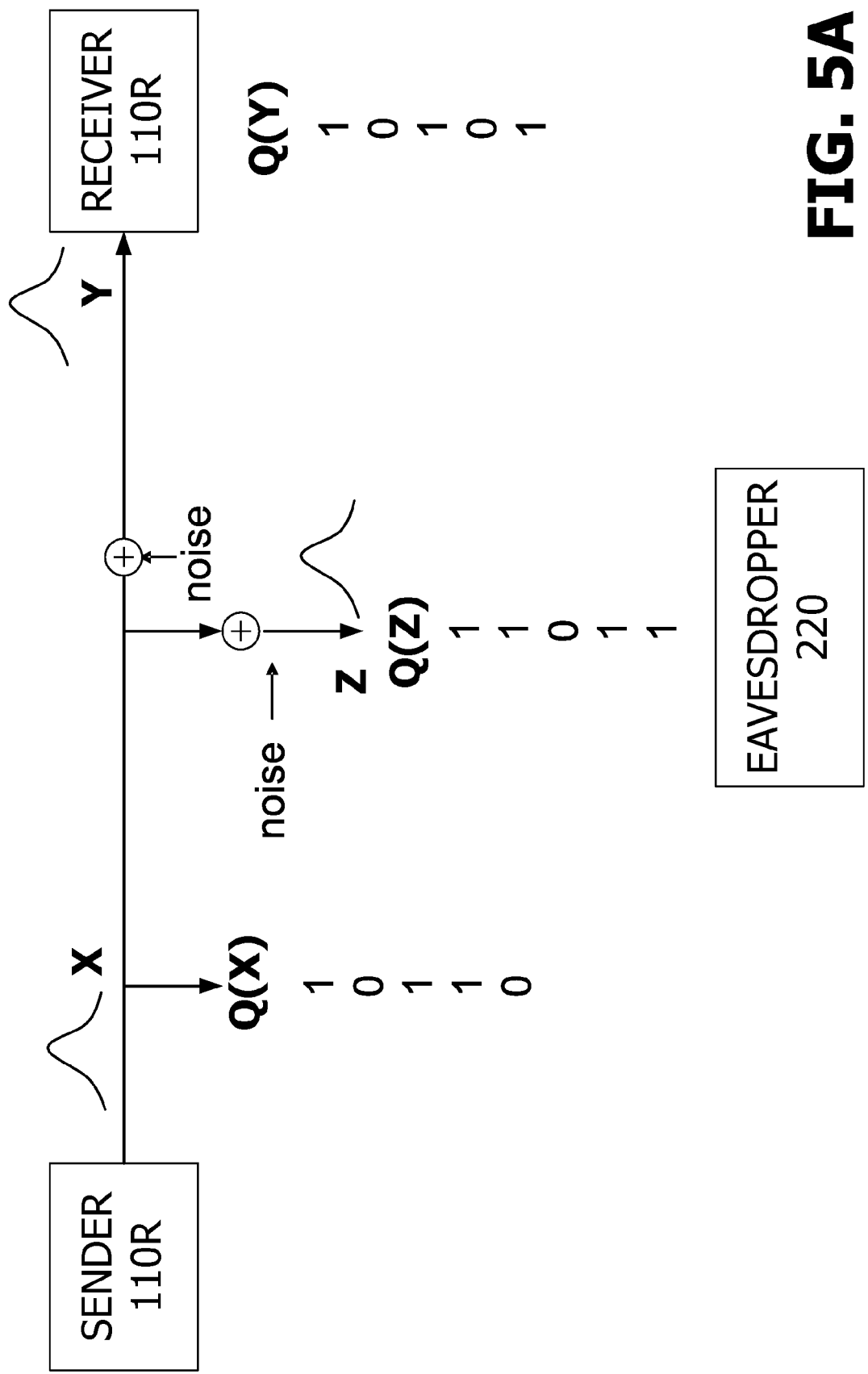

SYSTEMS AND METHODS OF SECURE CODING FOR PHYSICAL LAYER COMMUNICATION CHANNELS

CROSS REFERENCE TO RELATED APPLICATIONS

This application claims the benefit of U.S. Provisional Application No. 60/893,998, filed Mar. 9, 2007, which is hereby incorporated by reference.

FIELD OF THE DISCLOSURE

The present disclosure relates to data communication, and more specifically, to secure coding for physical layer communication channels.

BACKGROUND

The conventional method of providing secure communication over a channel uses cryptography. Cryptography relies on the existence of codes that are "hard to break": that is, one-way functions that are believed to be computationally infeasible to invert. Therefore, cryptography is vulnerable to an increase in computing power or the development of more efficient attacks. Furthermore, the assumptions about the hardness of certain one-way functions have not been proven mathematically, so cryptography is vulnerable if these assumptions are incorrect.

Another weakness of cryptography is the lack of no precise metrics or absolute comparisons between various cryptographic algorithms, showing the trade off between reliability and security as a function of the block length of plaintext and ciphertext messages. Instead, a particular cryptographic algorithm is considered "secure" if it survives a defined set of attacks, or "insecure" if it does not.

Cryptography as applied to some media (e.g., wireless networks) also requires a trusted third party as well as complex protocols and system architectures. Therefore, a need exists for these and other problems to be addressed.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure.

FIGS. 5A-E are block diagrams illustrating an example scenario with the sender, the receiver, and the eavesdropper from FIG. 1.

SUMMARY

Figure 1:
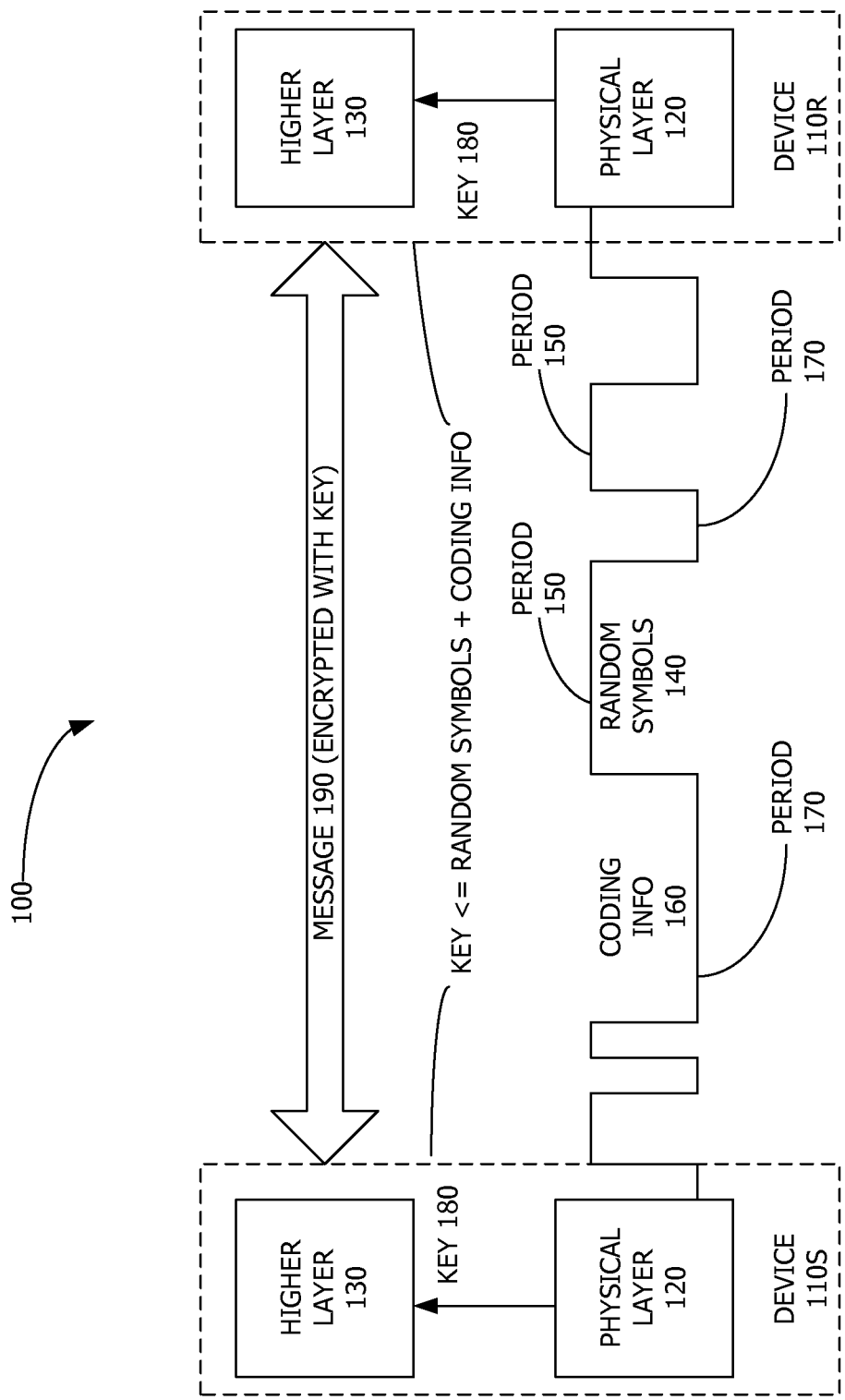
FIG. 1 is a block diagram of an environment in which one embodiment of a system and method for providing opportunistic security for physical communication channels is located.

Systems and methods of providing opportunistic security for physical communication channels are disclosed. One disclosed method is for securely communicating from a sender device to a receiver device on a main channel when an eavesdropper device is listening on an eavesdropper channel. The main channel has an signal-to-noise ratio $SNR_M$, and the eavesdropper channel has a signal-to-noise ratio $SNR_E$. The method comprises encoding a message at a physical layer with a secure error correcting code (SECC) to produce an encoded message, and transmitting the encoded message on the main channel. The SECC has a set of defined characteristics such that when the eavesdropper device is more than a predetermined distance Z from the sender, at least a predefined fraction of the message is unreliable. The predefined fraction of unreliable bits renders the eavesdropper unable to reliably decode messages on the main channel.

One disclosed system is for securely communicating from a sender device to a receiver device on a main channel when an eavesdropper device is listening on an eavesdropper channel. The main channel has an signal-to-noise ratio $SNR_M$, and the eavesdropper channel has a signal-to-noise ratio $SNR_E$. The system comprises an encoder and a transmitter. The encoder is configured to encode a plurality of bits at a physical layer with a secure error correcting code (SECC) to produce a plurality of encoded bits. The transmitter is configured to transmit the encoded plurality of bits on the main channel. The SECC has a set of defined characteristics such that when the eavesdropper device is more than a predetermined distance Z from the sender, a bit error probability on the eavesdropper channel does not exceed a predetermined security threshold while a bit error probability on the main channel does exceed a predetermined reliability threshold. The plurality of encoded bits includes a fraction of unreliable bits which render the eavesdropper unable to reliably decode messages on the main channel.

Also disclosed is a radio frequency identification (RFID) tag for securely communicating from the RFID tag to an RFID reader on a main channel when an eavesdropper device is listening on an eavesdropper channel. The main channel has an signal-to-noise ratio $SNR_M$, and the eavesdropper channel has a signal-to-noise ratio $SNR_E$. The system comprises an encoder and a transmitter. The encoder is configured to encode a plurality of bits at a physical layer with a secure error correcting code (SECC) to produce a plurality of encoded bits. The transmitter is configured to transmit the encoded plurality of bits on the main channel. The SECC has a set of defined characteristics such that when the eavesdropper device is more than a predetermined distance Z from the sender, at least a predefined fraction of the message is unreliable. The predefined fraction of unreliable bits renders the eavesdropper unable to reliably decode messages on the main channel.

DETAILED DESCRIPTION

Symmetric encryption uses a key to transform a message into a form that is unreadable to anyone that does not have the key. Since the key itself is a shared secret, this form of encryption relies on a method of providing the sender's key to the receiver in a secure manner. The systems and methods disclosed herein exploit naturally-occurring properties of the communication channel itself, at the physical layer, which allow the sender and the receiver to generate the same key, rather than having the sender transmit the key to the receiver, as occurs in conventional cryptographic solutions. In some embodiments, the distilled key is used by a higher protocol layer to encrypt messages, using, for example, standard secret key encryption algorithms. In other embodiments, the key distilled at both sides is used as a one-time pad to provide perfect secrecy.

FIG. 1 is a block diagram of an environment in which one embodiment of a system and method for providing opportunistic security for physical communication channels is located. A system 100 includes two devices, 110S and 110R, each of which includes a physical layer component 120 and a higher layer component 130. At the physical layer, sender device 110S uses two different time periods to transmit two different kinds of information to receiver device 110R: random symbols 140 are transmitted during some time periods 150; and coding information 160 is transmitted during other time periods 170. Both sender 110S and receiver 110R then use an algorithm to combine coding information 160 with random symbols 140 to distill a key 180.

Once discovered by each side, key 180 is then communicated from physical layer component 120 in each device 110 to the corresponding higher layer component 130 in the same device 110. After using key 180 to encrypt a message, higher layer component 130 in sender device 110S transmits the encrypted message 190 to receiver device 110R. Higher layer component 130 in receiver device 110R uses key 180 to decrypt message 190.

A few examples of higher protocol layer 130 are wired equivalent privacy (WEP) at the media access control (MAC) layer, internet protocol security (IPSec) at the network layer, and secure sockets layer (SSL) at the application layer. However, a person of ordinary skill in the art would understand that the key discovery techniques disclosed herein can be used by any protocol layer 130 above the physical layer. Such a person will also understand that although FIG. 1, and other figures herein, illustrate example scenarios in which device 110S acts as a sender and device 110R acts as a receiver, each device is capable of acting as both a transmitter and a receiver.

Figure 2:
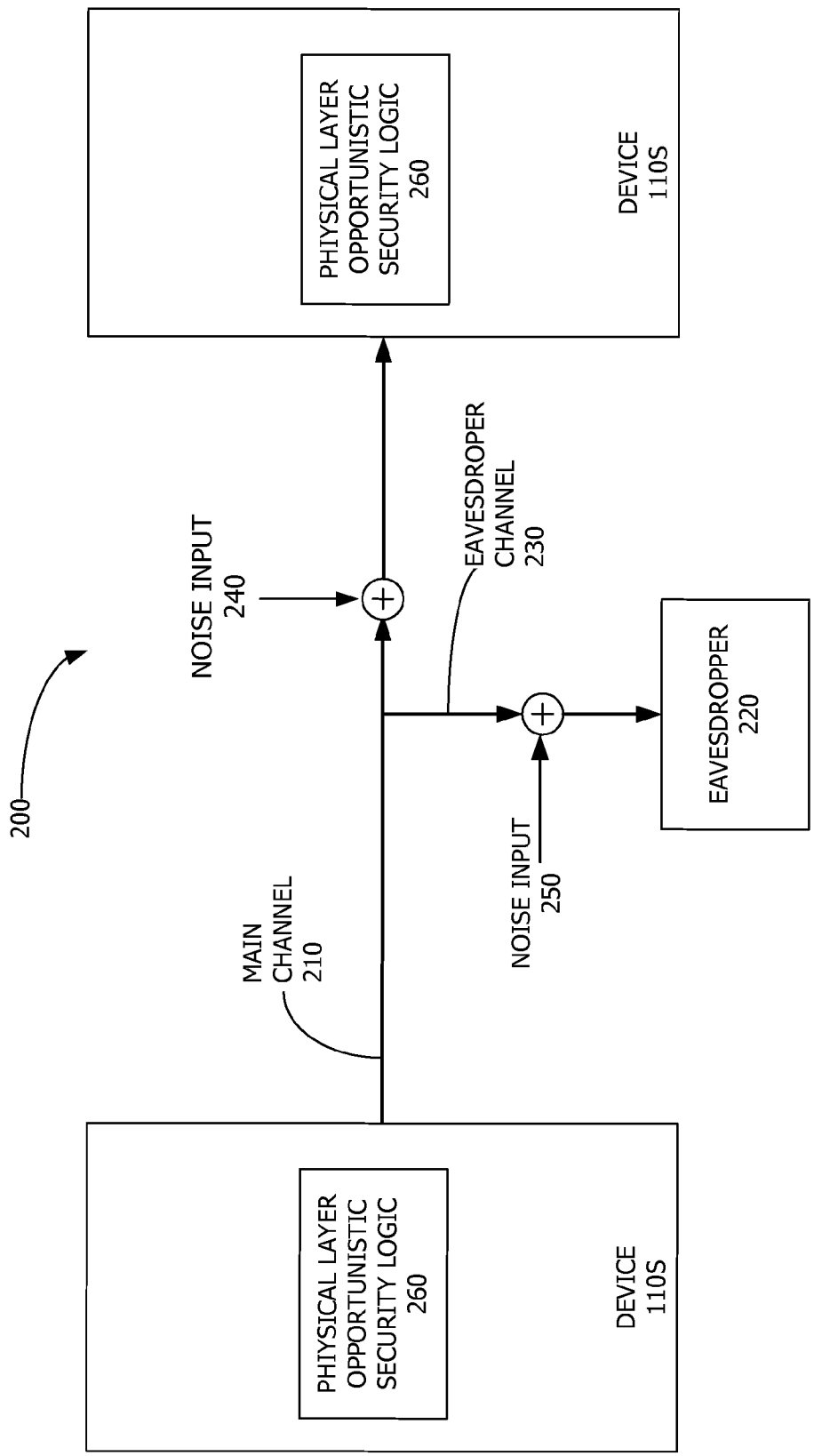
FIG. 2. is a block diagram of the channel between the sender device and the receiver device from FIG. 1, at the physical layer.

The physical layer of the channel between sender device 110S and receiver device 110R will now be described in more detail in connection with the block diagram of FIG. 2. System 200 includes devices 110, which are in communication over a main channel 210. System 200 also includes a third device 220, which is capable of listening to (eavesdropping on) transmissions on main channel 210, using an eavesdropper channel 230. Eavesdropper 220 is passive with respect to main channel 210; eavesdropper 220 does not jam main channel 210, insert bits on main channel 210, etc.

At the physical layer, both channels can be modeled as including noise inputs which affect signal quality: main channel 210 is affected by noise input 240 and eavesdropper channel 230 is affected by noise input 250. One or both of devices 110 has information about the signal quality on eavesdropper channel 230, and in embodiments where only one device 110 has this signal quality information, the information can be communicated to the other device. The techniques disclosed herein also allow for the possibility that eavesdropper 220 has information about the signal quality on main channel 210, but the techniques insure that such information is not sufficient to allow eavesdropper 220 to obtain key 180.

Figure 3:
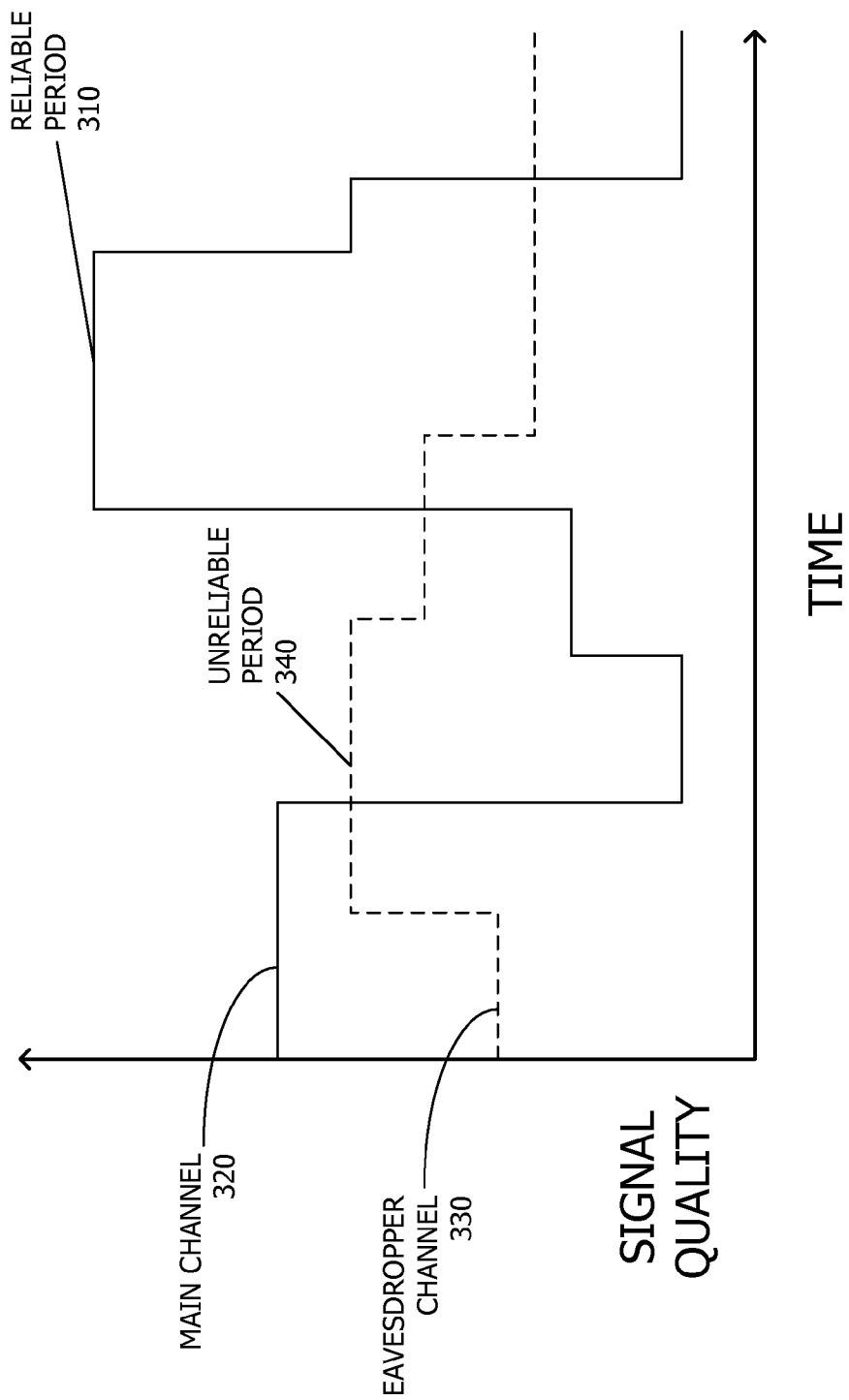
FIG. 3 is a graph of signal quality, over time, on the main channel and the eavesdropper channel from FIG. 1.

Both devices 110 include physical layer opportunistic security logic 260. Logic 260 in 110S cooperates with logic 260 in device 110R to provide security at the physical layer in an opportunistic manner, by exploiting characteristics of noisy channels 210, 230 in combination with information about relative signal quality of channels 210 and 230. These techniques for exploiting channel characteristics will be described in further detail after relative signal quality is discussed connection with FIG. 3, FIG. 3 is a graph of signal quality on main channel 210 and eavesdropper channel 230, over time. As can be seen in FIG. 3, there are time periods 310 during which signal quality 320 on main channel 210 is better than signal quality 330 on eavesdropper channel 230. In this disclosure, these time periods 310 will be referred to as "reliable" or "secret" time periods. There are also periods of time 340 during which the converse is true, and message channel signal quality 320 is worse than wiretap channel signal quality 330. These time periods 340 will be referred to as "unreliable" or "non-secret" time periods. Although this behavior is typical of wireless channels (where fading causes random fluctuations of the signal's amplitude and phase), a person of ordinary skill in the art would recognize that the principles described herein apply to any physical medium which experiences random noise or random fluctuations in signal strength, and thus these two different time periods.

Physical layer opportunistic security logic 260 exploits these varying differences in relative signal quality by communicating two different types of information from sender device 110S to receiver device 110R in these two different time periods. During periods 310 in which message channel signal quality 320 is better than wiretap channel signal quality 330—i.e., during secret periods—random symbols 140 are sent over main channel 210. In the example embodiments described herein, logic 260 in sender device 110S transmits these random symbols 140. In other embodiments, a fourth party (e.g., a broadcast satellite) transmits random symbols 140.

During periods 340 in which message channel signal quality 320 is worse than wiretap channel signal quality 330—i.e., during non-secret periods—coding information 160 is sent over main channel 210. Thus, there is a correspondence between the time periods in FIG. 3 and the time periods in FIG. 1: the secret periods 310 in FIG. 3 correspond to transmit-random-symbols periods 160 in FIG. 1, and the non-secret periods 340 correspond to transmit-coding-information periods 170.

During good-quality-on-message-channel periods 310, receiver device 110R accumulates random symbols 140 but does not use the bits represented by the symbols. After coding information 160 has been communicated during bad-quality-on-message-channel periods 340, sender 110S and receiver 110R combine this additional coding information 160 with the accumulated random symbols 140 to produce key 180 (see FIG. 1).

According to the principles of information-theoretic security, eavesdropper 220 cannot determine key 180 under these conditions. Information-theoretic security principles show that system 200 has positive secrecy capacity during good-quality-on-message-channel periods, or reliable periods, 310. As will be described in further detail below, sender device 110S and receiver device 110R share common randomness through the random symbols 140 transmitted by sender device 110S during reliable periods 310. This transmission results in a set of symbols which is correlated between sender and receiver. Information-theoretic security principles also show that system 200 has zero secrecy capacity during bad-quality-on-message-channel periods, or unreliable periods, 340. Coding information 160 is transmitted during unreliable periods 340, and receiver device 110R uses this coding information 160 to recover the bits represented by already-transmitted random symbols 140. The code is designed to match the secrecy capacity of a particular system: the strength of the code guarantees that legitimate receiver device 110R can recover a sequence of bits identical to those of the transmitter.

Since system 200 has (by definition) zero secrecy capacity during unreliable periods 340, it is possible for eavesdropper 220 to obtain some of the information that is transmitted during these unreliable periods 340. In fact, information theoretic security principles can quantify the maximum amount of information learned by eavesdropper 220, regardless of particular decoding methods which eavesdropper 220 might use. However, an additional step (privacy amplification) taken by sender 110S and receiver 110R after the reconstruction guarantees that eavesdropper 220 can obtain no information from the amplified reconstructed bit sequence. Since the amplified and reconstructed bit sequence can be used as a key 180 by both sides, it follows that the techniques disclosed herein allow key 180 to be generated by both sides in a manner that precludes eavesdropper 220 from obtaining key 180, and thus the techniques provide secure communication.

Figure 4:
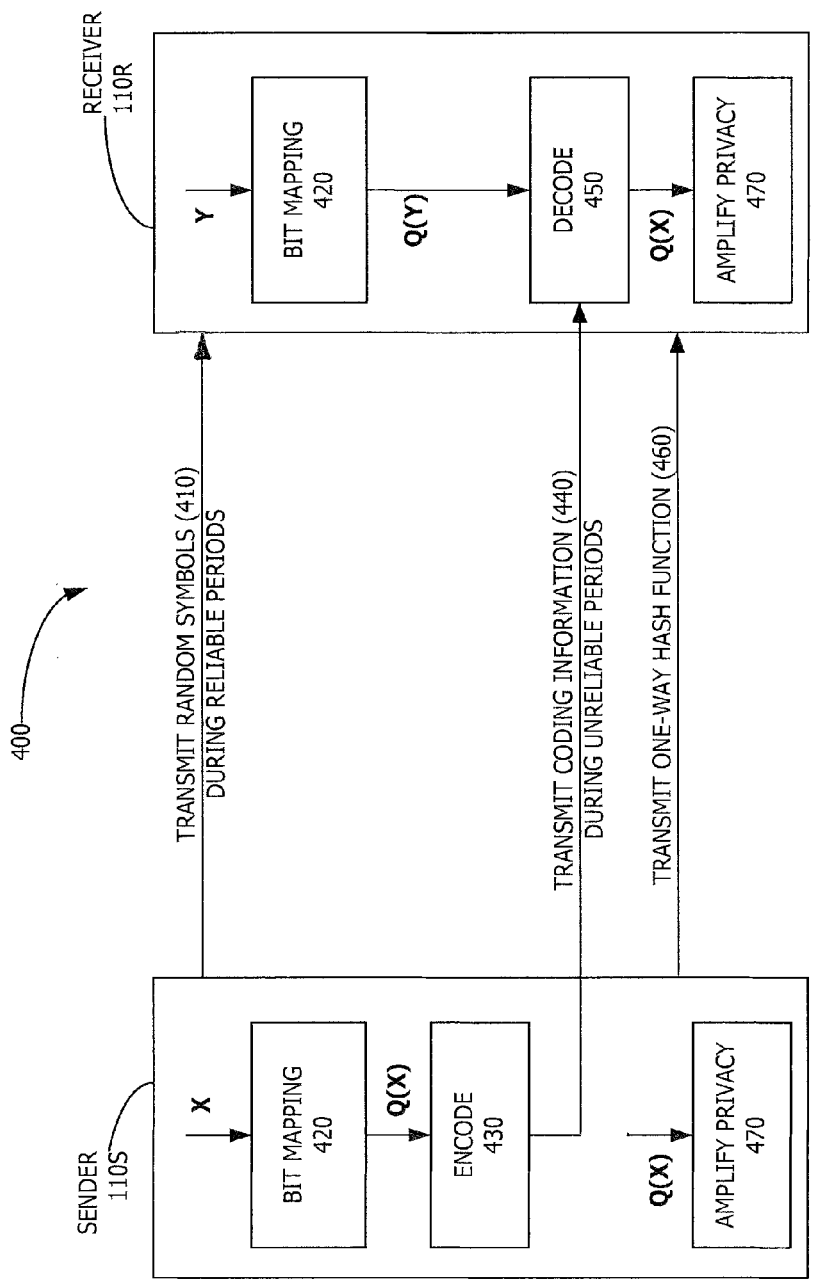
FIG. 4 is a sequence diagram of one embodiment of the logic for providing opportunistic security for physical communication channels from FIG. 1.

FIG. 4 is a sequence diagram of one embodiment of physical layer opportunistic security logic 260. Sequence 400 starts when logic 260 detects that message channel signal quality 320 is better than wiretap channel signal quality 330 (i.e., during a reliable period 310). A person of ordinary skill in the art would be familiar with detection using standard channel estimation techniques, such as pilot-assisted symbol estimation, etc. During reliable periods 310, sender 110S transmits (410) over main channel 210 a series of symbols (X) selected at random from a symbol set. In some embodiments, the symbols are quadrature amplitude modulation (QAM) symbols.

After the random symbol transmission 410, sender 110S and receiver 110R share a set of correlated continuous-valued symbols. Since continuous values are used, extracting a sequence of common bits from these continuous sequences is not straightforward, and standard coding techniques cannot be applied directly. Therefore, the systems and methods disclosed herein use multilevel coding. Multilevel coding quantizes the continuous symbols and then assigns a binary label to each of the quantized values. Although basic principles of multilevel coding have been proposed for use in general communication, here the use of multilevel codes is extended to the reconciliation of correlated sequences. In some embodiments, the number of symbols, the amplitudes of the symbols, and the probability distribution of the symbols are all optimized so that information is transmitted at a rate close to channel capacity, while still satisfying the power constraint of main channel 210.

Both sender 110S and receiver 110R map (420) the received symbols (X and Y respectively) to a bit sequence. However, since some amount of noise may be present on main channel 210, the bit sequence Q(Y) produced by receiver 110R may differ from the bit sequence Q(X) produced by sender 110S. That is, bit sequence Q(Y) may contain errors.

When logic 260 detects that message channel signal quality 320 is worse than wiretap channel signal quality 330 (i.e., during unreliable periods 340), sender 110S generates (430) error-correcting (coding) information 160 from the bit sequence Q(X), and transmits (440) coding information 160 over main channel 210. During these unreliable periods 340, receiver 110R decodes (450) coding information 160 and uses this information to recover or reconcile the original bit sequence Q(X). In some embodiments, coding information 160 takes the form of a low-density parity-check code (LDPC). In other embodiments, coding information 160 takes the form of a turbo code.

After reconciliation, sender 110S communicates (460) a random function over main channel 210, and each side applies (470) that random function to reconciled bit sequence Q(X). This application is also known as privacy amplification, and the result is secure key 180. In some embodiments, this random function is a universal hash function, with the property of producing an output sequence that is in general much smaller than the input sequence.

Notably, the reconciliation and privacy amplification steps, using coding information 160 already transmitted during a reliable period 310, may be conducted over several disjoint unreliable periods 340. Furthermore, in some embodiments coding information 160 is transmitted in some reliable periods 310 as well as unreliable periods 340, to ensure some minimum amount of time is available for processing random symbols are processed.

FIGS. 5A-E are block diagrams illustrating an example scenario with sender 110S, receiver 110R, and eavesdropper 220. Sender 110S and receiver 110R communicate over main channel 210, which is subject to noise input 240. Eavesdropper 220 listens on eavesdropper channel 230, which is subject to noise input 250.

FIG. 5A illustrates the behavior of the parties during reliable periods 310. As described earlier, sender 110S transmits over main channel 210 a sequence of random symbols 140. In this diagram, the symbol waveforms as seen by sender 110S, receiver 110R, and eavesdropper 220 are shown as X, Y, and Z, respectively, while the sequence of quantized bits detected by the three parties are shown as Q(X), Q(Y) and Q(Z), respectively. In this example, the originally transmitted bit sequence Q(X) is 10110. Since main channel 210 is subject to noise, the sequence Q(Y) seen by receiver 110R is slightly different: 10101. Since transmission of random symbols occurs during reliable periods 310, in which message channel signal quality 320 is better than wiretap channel signal quality 330, the sequence Q(Z) seen by eavesdropper 220 will, on average, contain more errors. Here, Q(Z) is 11011, which contains three bit errors as compared to two bit errors in Q(Y).

Figure 5B:
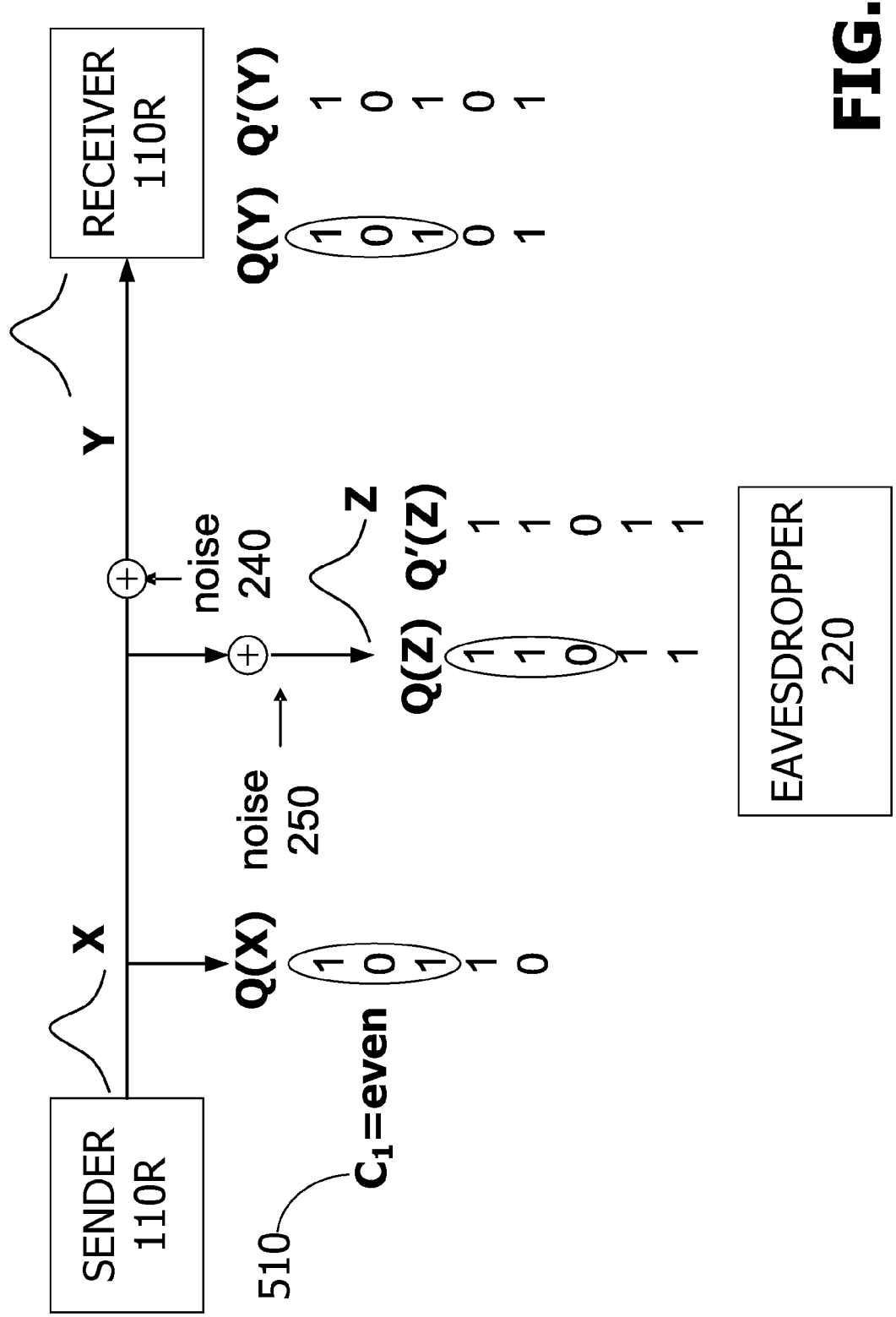

FIG. 5B illustrates the behavior of the parties during unreliable periods 340. As described earlier, sender 110S transmits coding information 160 which allows receiver 110R to reconstruct the original bit sequence Q(X) from the received—and possibly errored—bit sequence Q(Y), while also preventing eavesdropper 220 from reconstructing the original sequence. In this example, the error correcting code is a single parity bit protecting a group of three bits, so the transmitted code C1 (510) indicates even parity. The first three bits in Q(Y) were received by receiver 110R with even parity, so no error is detected by receiver 110R and the first three bits in Q(Y) remain as is. Eavesdropper 220 also receives code C1, but the bits in Q(Z) contain more errors, since wiretap channel signal quality 330 was worse when Q(Z) was received. Thus, the first three bits in Q(Z) still contain errors, even after code C1 is received.

Figure 5C:
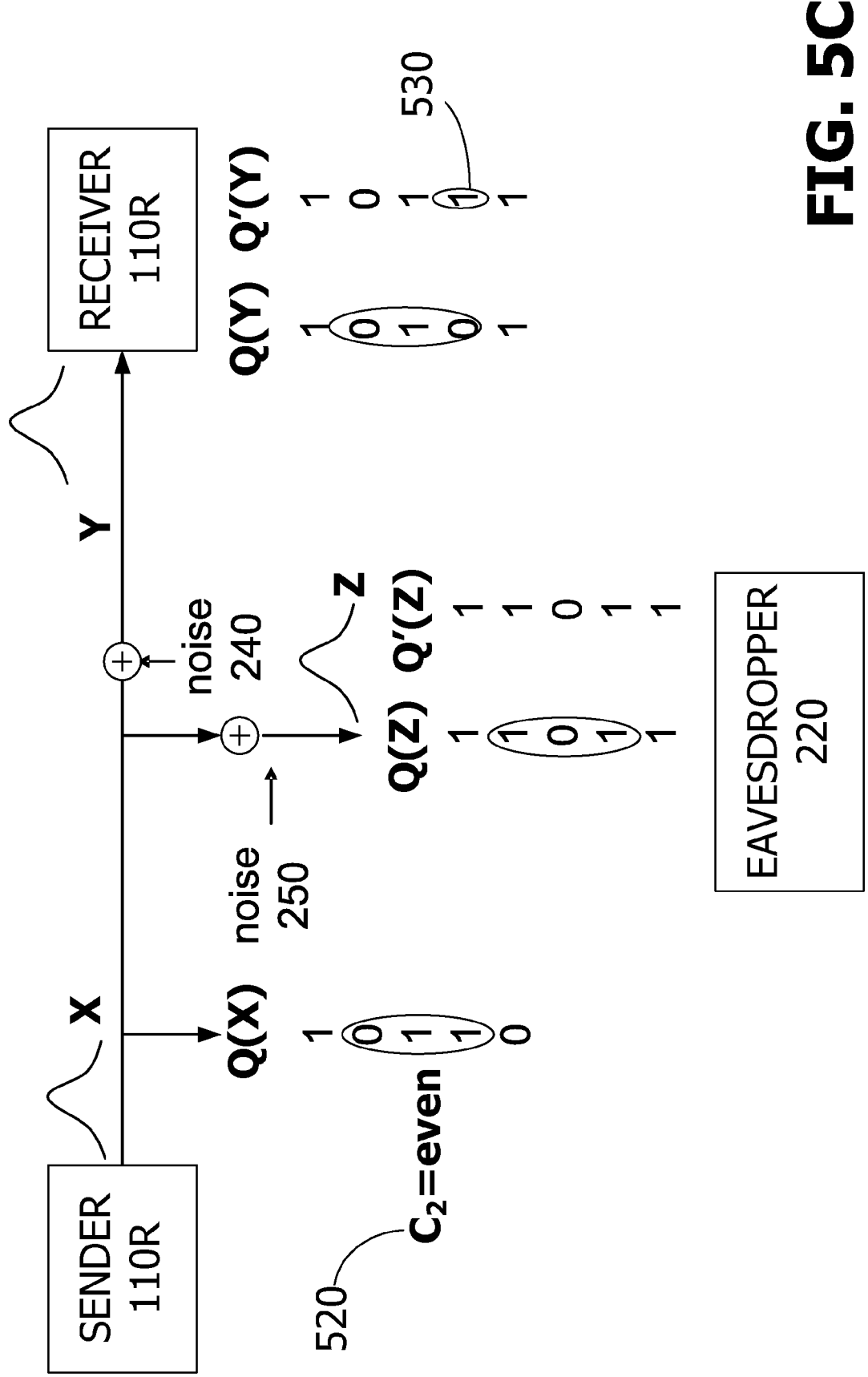
Figure 5D:
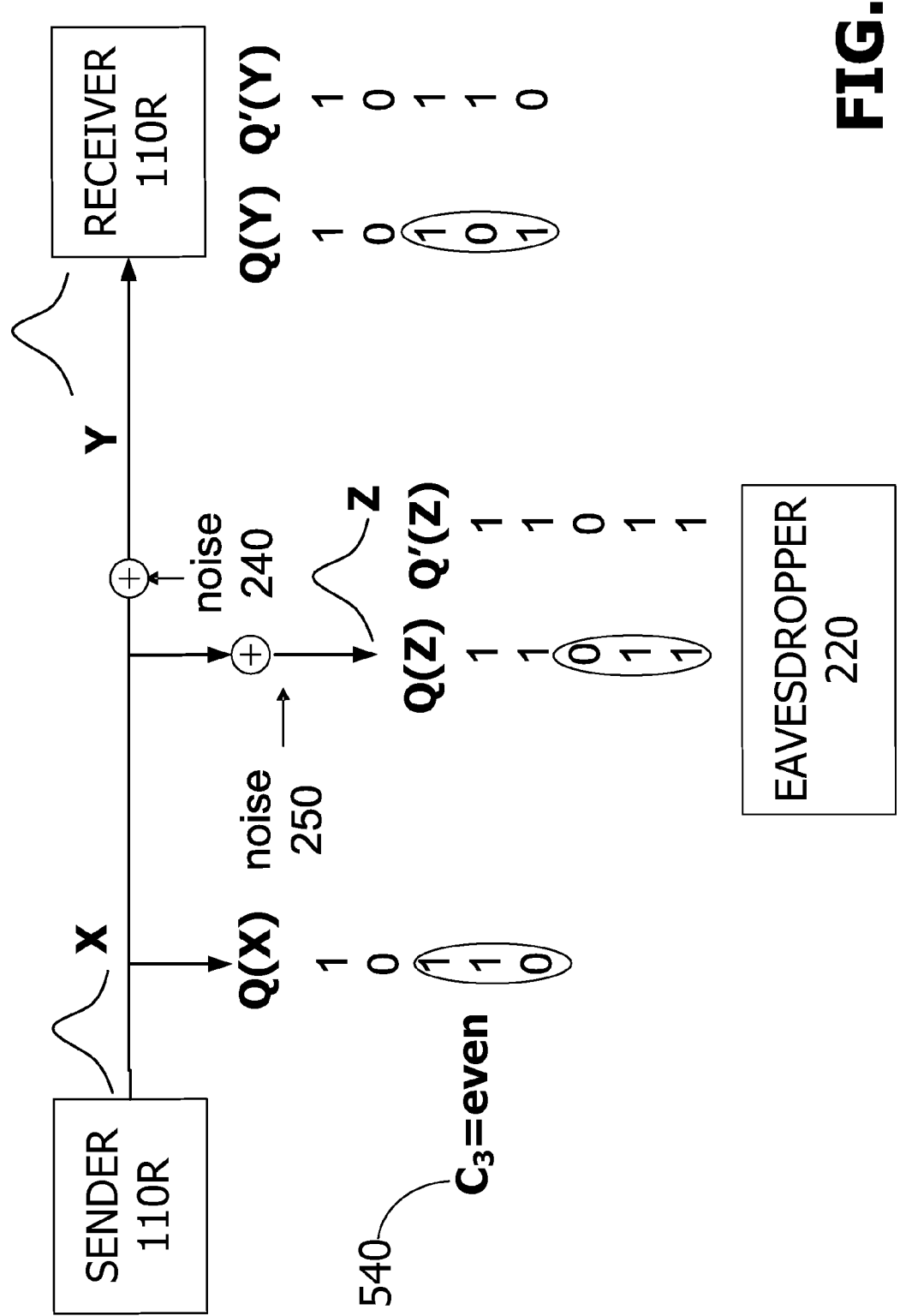

The reconciliation phase continues as illustrated in FIG. 5C. The transmitted code C2 (520) also indicates even parity. Here, the second group of three bits in Q(Y) were received with odd parity, so an error is detected and the second group of three bits in Q(Y) are corrected to 010. The reconciliation phase is completed in FIG. 5D, where transmitted code C3 (530) indicates even parity, and the last three bits in Q(Y) remain unchanged. As before, Q(Z) as seen by eavesdropper 220 still contains errors, even after all three codes C1, C2 and C3 are received.

Figure 5E:
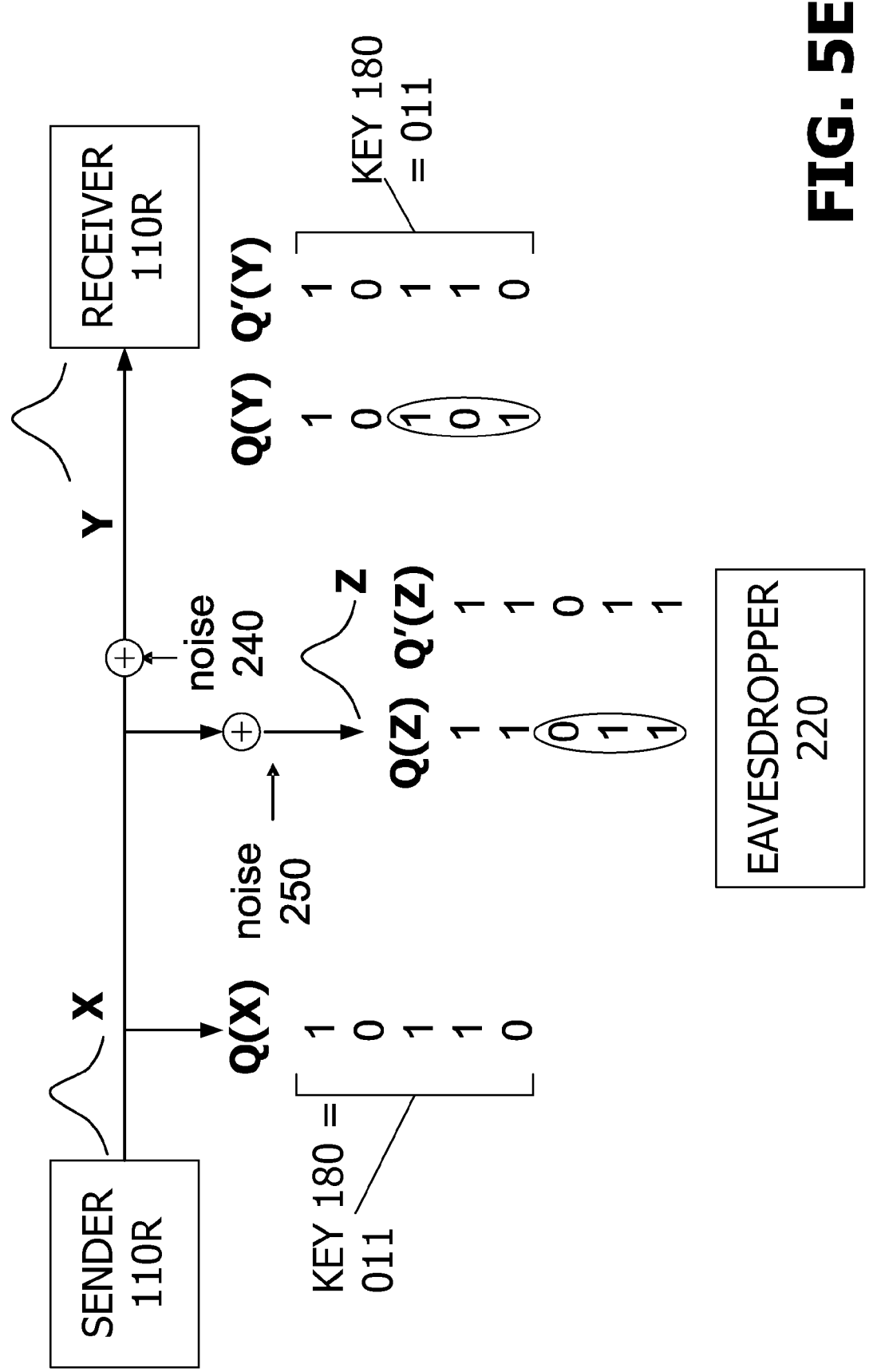

The final phase for key generatio is illustrated in FIG. 5E. At the end of the reconciliation function, the bit sequence Q(Z) is still correlated with sequence Q(X), which means eavesdropper 220 can guess some information about original bit sequence Q(X). To amplify the amount of privacy, sender 110S broadcasts a random function, which is received by receiver 110R and eavesdropper 220. Each party applies the random function to Q(X), Q(Y), and Q(Z), respectively. Application of the random function by sender 110S and receiver 110R produces the same key 180, while eavesdropper 220 produces a different key 540. Information-theoretic security principles guarantee that each bit of the eavesdropper-generated key 560 has a particular degree of independence from corresponding bits of key 180. That is, the error correcting code and the privacy amplification function are designed to guarantee that key 540 is as independent of key 180 as is desired, which means that eavesdropper 220 can extract no information about key 180.

Figure 6:
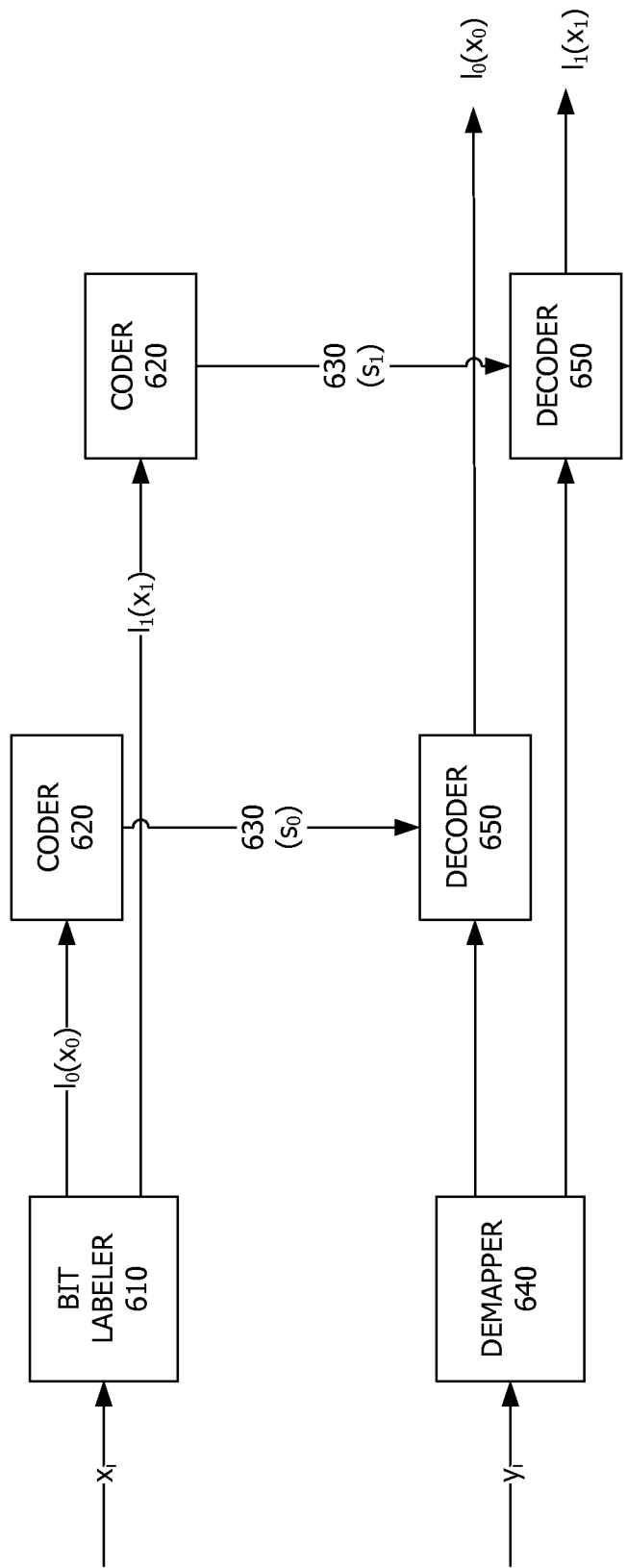
FIG. 6 is a block diagram of the multilevel coder and encoder used by some embodiments of the logic for providing opportunistic security for physical communication channels from FIG. 1.

FIG. 6 is a block diagram of the multilevel coder and encoder used by some embodiments of physical layer opportunistic security logic 260. As described earlier, noise input 240 introduces discrepancies between the received data as seen by receiver 110R and the random symbols sent by sender 110S. Sender 110S generates reconciliation, or coding, information 160 to correct these discrepancies. Logic 260 within sender device 110S includes a bit labeler 610 which receives transmitted symbols X and assigns an m-bit binary label to each symbol X. A multilevel coder 620 (e.g., a LDPC coder) successively computes a series of m syndromes s. Syndromes s are transmitted on main channel 210 during reliable periods 310.

Logic 260 within receiver device 110R recovers syndromes s. Random symbols Y (previously received during unreliable periods 340) are processed by a demapper 630 to produce a bit sequence which, in combination with syndromes s, is decoded by a multistage decoder 650. Thus, decoder 650 uses syndromes s as side information.

Figure 7:
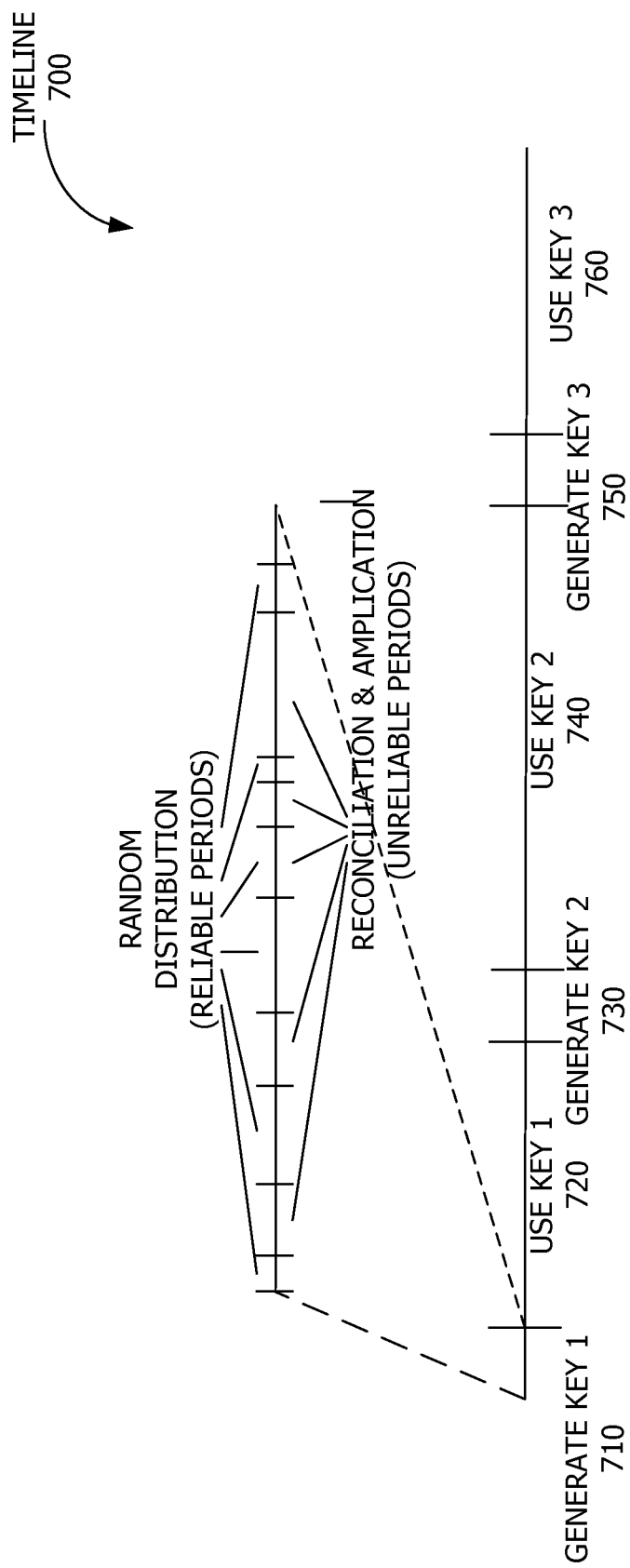
FIG. 7 is a diagram illustrating a timeline for generating and using multiple keys over time applicable to one embodiment of the logic for providing opportunistic security for physical communication channels from FIG. 1.

FIG. 7 is a diagram illustrating a timeline 700 for generating and using multiple keys over time. A time period 710 in which a first key is generated is followed by another time period 720 in which the first key is used for encryption. A second key is generated in time period 730, and this second key is used during time period 740. Similarly, a third key is generated in time period 750, and this third key is used during time period 760. As explained earlier, each of key generatio periods 710, 730, 750 is itself composed of reliable subperiods during which random symbols are distributed and unreliable sub-periods during which reconciliation occurs. In this manner, key 180 is periodically refreshed, so that even if eavesdropper 220 guesses one instance of the key, that key instance is in use for only a short period of time.

In some embodiments, the frequency of key generatio is based on characteristics of main channel 210, eavesdropper channel 230, or both (e.g., the ratio of reliable periods 310 to unreliable periods 340, the ratio of average main channel signal quality to average eavesdropper channel signal quality, or the absolute signal quality of either channel). In some embodiments, physical layer component 120 (see FIG. 1) generates the key in response to a request by higher-layer component 130. In other embodiments, physical layer component 120 generates the key of its own accord, without a request by higher-layer component 130.

In the embodiments discussed above, a key was generated at both the sender and receiver by combining information transmitted during a positive-secrecy time period (transmission of random symbols) with information transmitted during a zero-secrecy time period (coding information used to reconcile the correlated symbols). Other embodiments will now be described which take advantage of environments in which the main message channel (between "friendly" transmitter and "friendly" receiver) always has positive secrecy capacity.

Positive secrecy capacity is assured when the eavesdropper is more than a certain distance away from the friendly (message) transmitter, thus guaranteeing that the signal quality on the message channel is better than the signal quality on the eavesdropper channel. In such environments, all transmission periods are considered to be good-quality-on-message-channel periods 310. The embodiments described below in connection with FIGS. 8-11 utilize secure error correcting codes (SECCs) at the physical layer to insure communication between the friendly parties that is both reliable and secure.

In the real world, this assumption is perhaps most reasonable when the distance between friendly transmitter and the friendly receiver is on the order of a few meters. One non-limiting example of such a scenario is an radio frequency identification (RFID) tag transmitting to a RFID reader. In such cases, an eavesdropper that is on the order of tens of meters away from the friendly transmitter has an signal quality that is hundreds of times worse than that of the main message channel (since the signal power is proportional to the square of the distance). However, the techniques described herein are applicable any time the message channel has positive secrecy capacity. The laws of physics gurantees that the signal quality will be lower for the eavesdropper as long as the eavesdropper is physically further away from the friendly transmitter than the friendly receiver is. The relative antenna sizes of the friendly parties and the eavesdropper determine the specific distance between the eavesdropper and the friendly transmitter that is required for positive secrecy capacity to be obtained. In other words, the techniques described below can guarantee a perfect secrecy zone of size Z around the friendly transmitter, given a specific set of antenna sizes.

Figure 8:
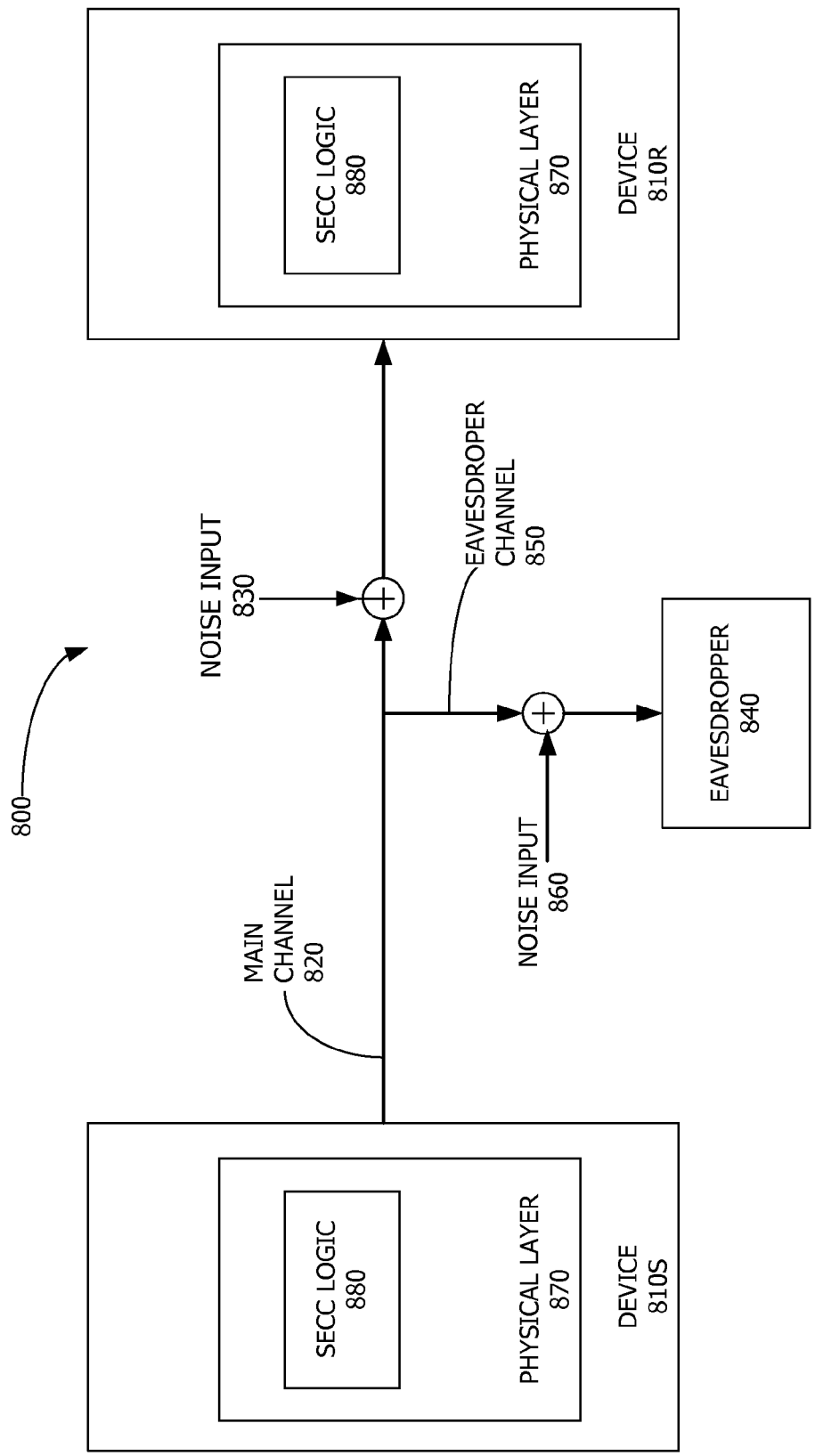
FIG. 8 is a block diagram of one embodiment of a sender device and a receiver device utilizing secure error correcting codes at the physical layer.

FIG. 8 is a block diagram of a sender device and a receiver device utilizing secure error correcting codes at the physical layer. System 800 includes devices 810S and 810R which are in communication over a main channel 820. Main channel 820 is subject to a noise input 830. System 800 also includes another device 840 which is capable of listening to (eavesdropping on) transmissions on main channel 820, over an eavesdropper channel 850. Eavesdropper channel 850 is subject to a noise input 860. Eavesdropper 840 is passive with respect to main channel 820; eavesdropper 840 does not jam main channel 820, insert bits on main channel 820, etc. In the embodiments discussed below in connection with FIGS. 8-11, channels 820 and 850 are wireless. A non-limiting list of examples of wireless technologies includes: radio frequency identification (RFID) networks (e.g., ISO 14443, ISO 18000-6); wireless local area networks (e.g. IEEE 802.11, commonly known as WiFi); wireless wide area networks (e.g., WiMAX or IEEE 802.16); wireless personal area networks (e.g., Bluetooth, IEEE 802.15.4, commonly known as ZigBee) and wireless telephone networks (e.g., CDMA, GSM, GPRS, EDGE). Although the embodiments discussed below in connection with FIGS. 8-11 involve wireless channels 820 and 880, the principles disclosed herein apply also apply to wired channels.

Each device 810 includes a physical layer component 870, where the physical layer 870 incorporates secure error correcting coding (SECC) logic 880. Although device 810S is described as operating a sender and device 810R as a receiver, a person of ordinary skill in the art would understand that each device 810 is capable of acting as both a transmitter and a receiver.

Figure 9:
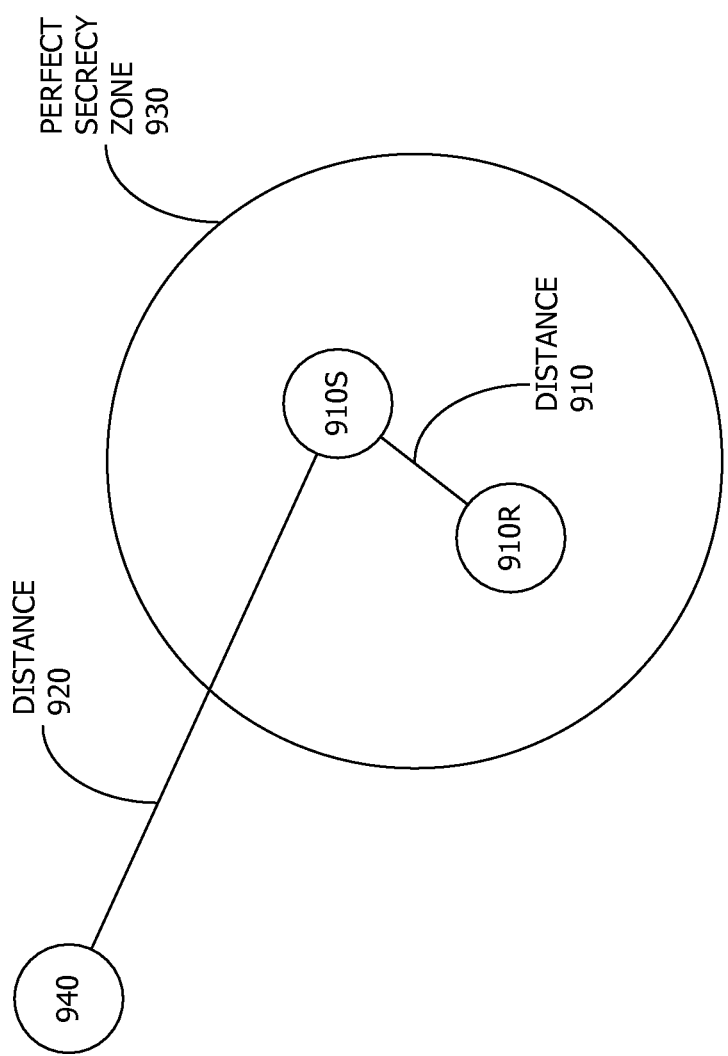
FIG. 9 is a diagram of one embodiment of the devices from FIG. 8.

FIG. 9 is a diagram of devices 810S and 810R utilizing secure error correcting codes at the physical layer. FIG. 9 illustrates a feature which is exploited by some embodiments when devices 810 are in close proximity to each other relative to the distance from eavesdropper 840. When the distance 910 from sender 810S to receiver 810R is much smaller than the distance 920 from sender 810S to eavesdropper 840, the signal-to-noise ratio on main channel 820 ($SNR_M$) is better than the signal-to-noise ratio on eavesdropper channel 850 ($SNR_E$), as can be shown using basic communications theory.

The secure error-correcting coding techniques disclosed herein exploit this property to insure that information on main channel 820 remains secret from eavesdropper 840 while also providing high reliability on main channel 820. The secure error correcting code (SECC) used by logic 880 provides a perfect secrecy zone 930 within a given distance Z from sender 810S. In the example embodiment shown in FIG. 9, perfect secrecy zone 930 is a circle, so that Z is the radius of that circle. Outside perfect secrecy zone 930, the signal-to-noise ratio on eavesdropper channel 850 ($SNR_E$) results in a bit error rate on eavesdropper channel 850 ($BER_E$) that is high enough to guarantee that a specific percentage of the bits obtained from transmissions by sender 810S are unreliable. Logic 880 uses an SECC which guarantees that this unreliable information renders eavesdropper 840 unable to reliably decode messages sent on main channel 820. A suitably designed SECC ensures that the bit error rate experienced by the eavesdropper is higher than the bit error rate produced by a conventional error correcting code. In fact Shannon's information theory can be used to show the existence, in certain situations, of SECCs that make the reliability of the eavesdropper's information as low as possible.

Figure 10:
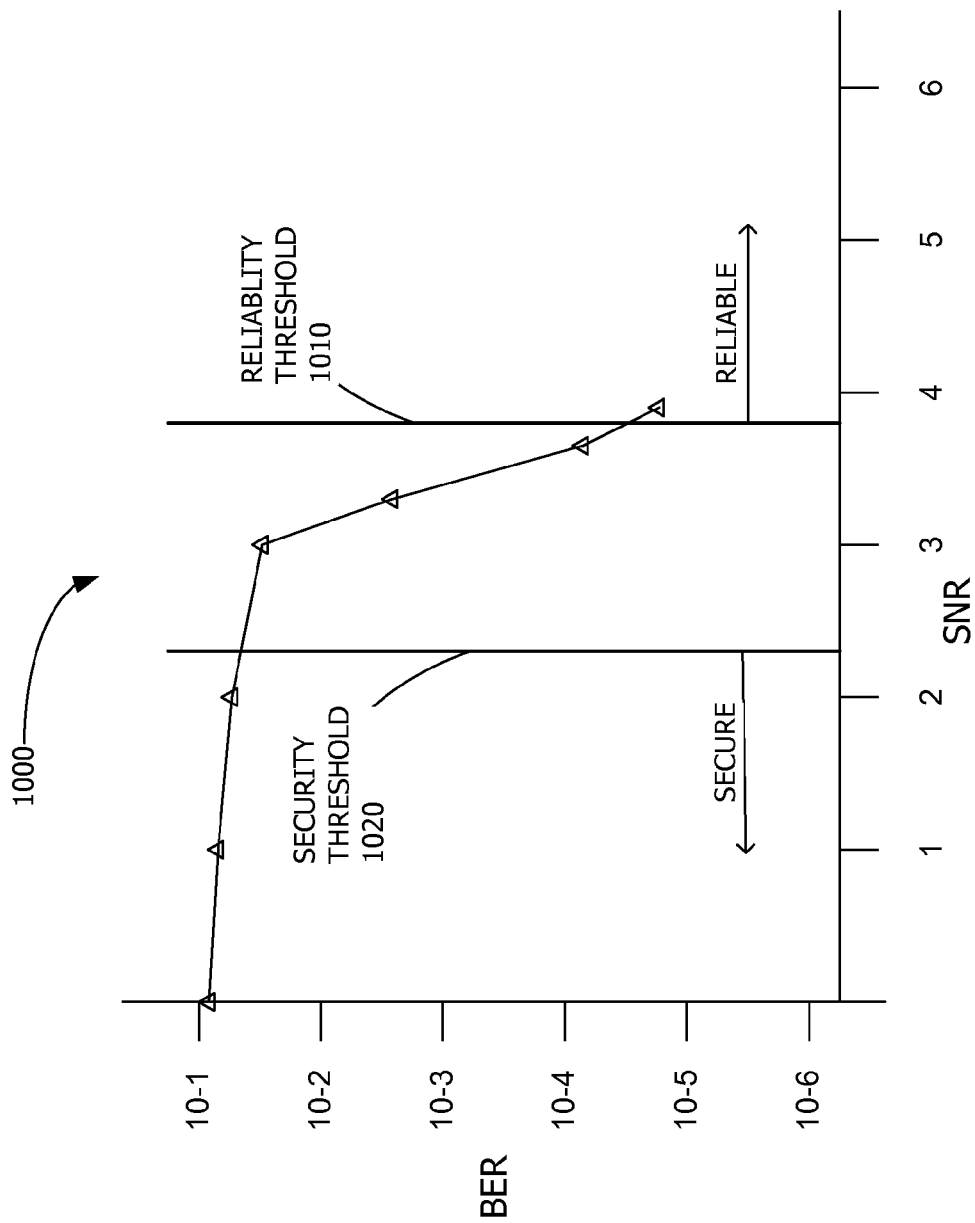
FIG. 10 is a graph illustrating bit error probability performance of a secure error correcting code used by an example embodiment of the secure error correct code (SECC) logic from FIG. 8.

To do so, logic 880 uses a secure error correcting code (SECC) with specific properties or characteristics. These properties or characteristics are related to $SNR_M$ and $SNR_E$, where $SNR_M$ and $SNR_E$ are turn related to the distance between sender 810S and receiver 810R, and the distance from sender 810S to eavesdropper 840 (respectively). FIG. 10 is a graph 1000 illustrating bit error probability performance of a secure error correcting code used by an example embodiment of logic 880. As can be seen in the plot of SNR vs. BER behavior in graph 1000, for a given expected SNR on main channel 820 (SNRM), the SECC used by logic 880 produces a bit error rate (on main channel 820) which exceeds a predetermined reliability threshold 1010. For a given expected SNR on eavesdropper channel 850, the same SECC produces a bit error rate (on eavesdropper channel 850) which is less than a predetermined security threshold 1020. The SECC used by logic 880 could thus be described as exhibiting a sharp waterfall region (sharp dropoff between 1010 and 1020) as well as high BER at low SNRs. In some embodiments, the SECC used by logic 880 is based on a linear block code. In other embodiments, the SECC is a turbo code. In still other embodiments, the SECC is a low density parity check code.

Various embodiments of SECC logic 880 achieve a larger or smaller perfect secrecy zone 1030 by using an SECC with a slightly different SNR vs. BER curve. For example, a larger perfect secrecy zone 1030 is achieved by using a code which has a lower BER at a high SNR as compared to FIG. 10. In other words, the predetermined reliability threshold 1010 moves to the right. Codes that provide a larger secrecy zone may be relatively complex. A smaller perfect secrecy zone 1030 is achieved by using a code in which the predetermined reliability threshold 1010 moves to the left as compared to FIG. 10.

Some embodiments of devices 810S and 810R include encryption at higher layers of the protocol stack in addition to the security provided by SECC logic 880 at the physical layer. A few examples of encryption at a higher layer are wired equivalent privacy (WEP) at the media access control (MAC) layer, internet protocol security (IPSec) at the network layer, and secure sockets layer (SSL) at the application layer. However, the SECC techniques disclosed herein can be used in combination with any protocol layer above the physical layer. When using this combination principles of information-theoretic security show that as long as the eavesdropper is more than a certain distance away from the friendly transmitter and receiver, the eavesdropper will necessarily have a number of errors after decoding and that this number of errors, when combined with a particular cryptographic code, will render the eavesdropper virtually unable to decode the message. Furthermore, the SECC techniques described herein allow flexibility in the level of security that is required against an eavesdropper. For example, if it is known that the eavesdropper is more than a certain distance away, then the SECC can be less complex.

Figure 11:
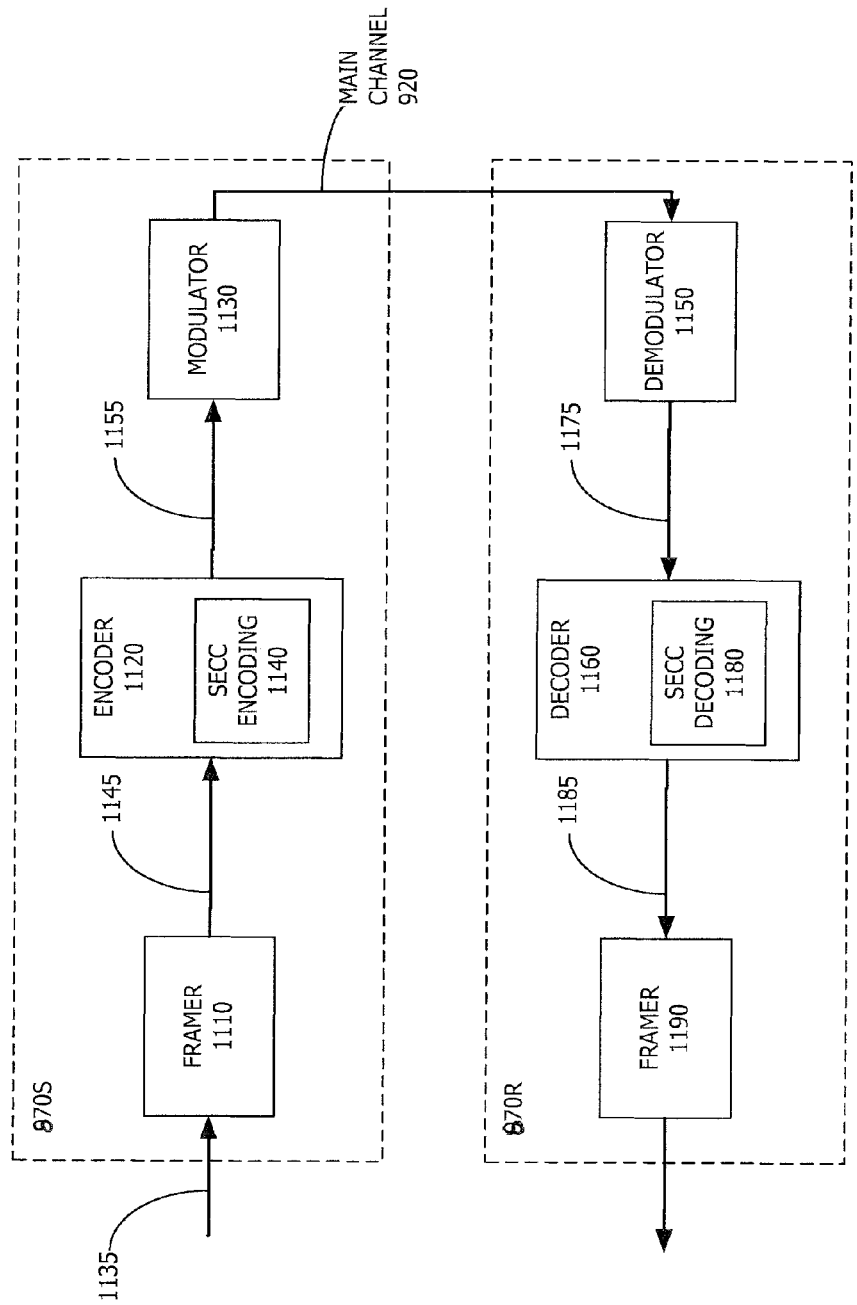
FIG. 11 is a block diagram illustrating selected components of one embodiment of the physical layer component from FIG. 8.

FIG. 11 is a block diagram illustrating selected components of one embodiment of a physical layer 870. Sender physical layer 870S includes a framer 1110, an encoder 1120, and a modulator 1130. Framer 1110 operates on a message from a higher protocol layer. The message comprises a stream of bits 1135, and produces a block 1145, which may include header and trailer information. Block 1145 is encoded by SECC encoding logic 1140 within encoder 1120, producing one or more encoded bits 1155. Encoded bits 1155 are modulated by modulator 1130 and transmitted over main channel 820 to receiver physical layer 870R. Receiver physical layer 870R inculdes a demodulator 1150, a decoder 1160, and a framer 1170. Symbols received on main channel 820 are mapped to bits 1175 by demodulator 115, and bits 1175 are decoded by SECC decoding logic 1180 within decoder 1160. The group of decoded bits 1185 are received by framer 1190, which strips off header/trailer bits as necessary to reveal the orginally transmitted message. The message may then be passed up to a higher protocol layer.

In some embodiments, one side of the communication channel has less processing or computing capabilities than the other. In some embodiments, the properties of the communication channel may be asymmetrical (e.g., 10 Mbit/sec in one direction and 1 Mbit/sec in the other). In such embodiments, one side may use different modulation and/or framing techniques when transmitting than the other side does. As a non-limiting example, one side may transmit using quadrature amplitude modulation with 16 different symbols (QAM16) while the other side may transmit using quadrature amplitude modulation with 64 different symbols (QAM64).

Figure 12:
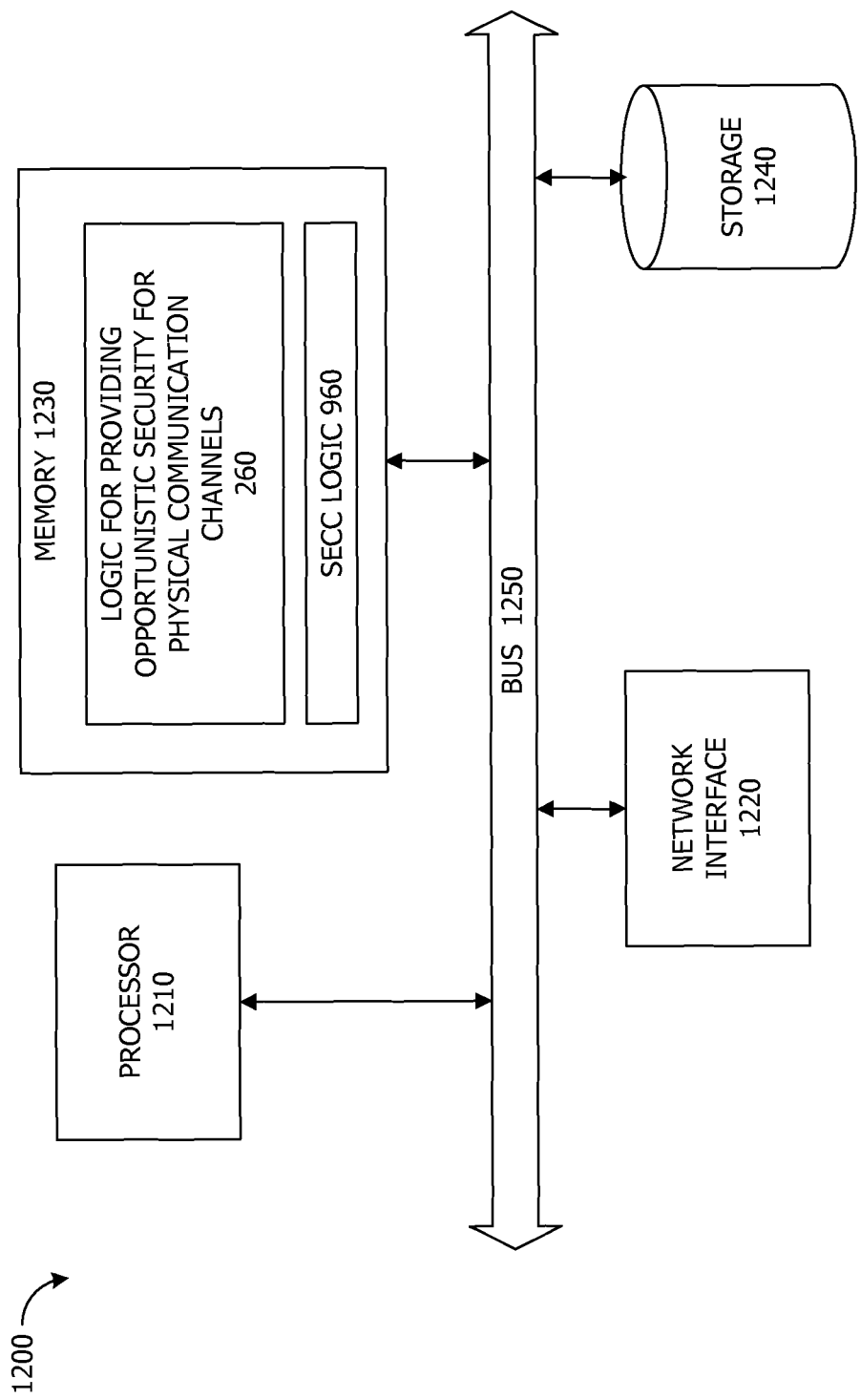
FIG. 12 illustrates an exemplary hardware block diagram of a computer system which can be used in connection with exemplary embodiments.

FIG. 12 is a hardware block diagram of a computer system 1200 which can be used to implement device 110 in accordance with various embodiments of the systems and methods of providing opportunistic security for physical communication channels, or to implement device 810 in accordance with various embodiments of the systems and methods of utilizing secure error correcting codes at the physical layer. Computer system 1200 contains a number of components that are well known in the art of data communications, including a processor 1210, a network interface 1220, memory 1230, and non-volatile storage 1240. These components are coupled via bus 1250. A person of ordinary skill in the art would understand that the network interface 1220 may support different medias, speeds, etc. Examples of non-volatile storage include, for example, a hard disk, flash RAM, flash ROM, EEPROM, etc. Memory 1230 contains physical layer opportunistic security logic 260 from FIG. 1 and/or SECC logic 880 from FIG. 8, which programs or enables processor 1210 to perform the functions of logic 260 or logic 880. Omitted from FIG. 12 are a number of conventional components, known to those skilled in the art, that are not necessary to explain the operatio of computer system 1200.

Device 110 can be implemented in software, hardware, or a combination thereof. In some embodiments, the device, system, and/or method is implemented in software that is stored in a memory and that is executed by a suitable microprocessor, network processor, or microcontroller situated in a computing device. In other embodiments, the device, system and/or method is implemented in hardware, including, but not limited to, a programmable logic device (PLD), programmable gate array (PGA), field programmable gate array (FPGA), an application-specific integrated circuit (ASIC), a system on chip (SoC), and a system on packet (SoP).

Device 110 can be embodied in any computer-readable medium for use by or in connection with an instruction execution system, apparatus, or device. Such instruction execution systems include any computer-based system, processor-containing system, or other system that can fetch and execute the instructions from the instruction execution system. In the context of this disclosure, a "computer-readable medium" can be any means that can contain, store, communicate, propagate, or transport the program for use by, or in connection with, the instruction execution system. The computer readable medium can be, for example but not limited to, a system or propagation medium that is based on electronic, magnetic, optical, electromagnetic, infrared, or semiconductor technology.

Specific examples of a computer-readable medium using electronic technology would include (but are not limited to) the following: an electrical connection (electronic) having one or more wires; a random access memory (RAM); a read-only memory (ROM); an erasable programmable read-only memory (EPROM or Flash memory). A specific example using magnetic technology includes (but is not limited to) a portable computer diskette. Specific examples using optical technology include (but are not limited to) an optical fiber and a portable compact disk read-only memory (CD-ROM).

Any process descriptions or blocks in flowcharts would be understood as representing modules, segments, or portions of code which include one or more executable instructions for implementing specific logical functions or steps in the process. As would be understood by those of ordinary skill in the art of the software development, alternate implementations are also included within the scope of the disclosure. In these alternate implementations, functions may be executed out of order from that shown or discussed, including substantially concurrently or in reverse order, depending on the functionality involved.

The foregoing description has been presented for purposes of illustratio and description. It is not intended to be exhaustive or to limit the disclosure to the precise forms disclosed. Obvious modifications or variations are possible in light of the above teachings. The implementations discussed, however, were chosen and described to illustrate the principles of the disclosure and its practical application to thereby enable one of ordinary skill in the art to utilize the disclosure in various implementations and with various modifications as are suited to the particular use contemplated. All such modifications and variation are within the scope of the disclosure as determined by the appended claims when interpreted in accordance with the breadth to which they are fairly and legally entitled.

What is claimed is:

1. A method for securely communicating from a sender device to a receiver device on a main channel when an eavesdropper device is listening on an eavesdropper channel, the method comprising:

encoding a message with a secure error correcting code (SECC) to produce an encoded message, the SECC having a set of defined characteristics that cause a bit error rate (BER) on the main channel to be lower than a first threshold BER value and cause a BER on the eavesdropper channel to be higher than a second threshold BER value when a distance between the eavesdropper device and the sender device is greater than the distance between receiver devices and the sender device, wherein the second threshold BER value is greater than the first threshold BER value; and transmitting the encoded message on the main channel, wherein the SECC has the set of defined characteristics such that when the eavesdropper device is more than a predetermined distance Z from the sender, at least a predefined fraction of the message is unreliable, where the predefined fraction of unreliable bits renders the eavesdropper unable to reliably decode messages.

2. The method of claim 1, wherein the encoding is performed at the physical layer of the sender device.

3. The method of claim 1, wherein the main channel comprises a wireless channel.

4. The method of claim 1, wherein the SECC comprises a low density parity check code.

5. The method of claim 1, wherein the SECC comprises a turbo code.

6. A system for securely communicating from a sender device to a receiver device on a main channel when an eavesdropper device is listening on an eavesdropper channel, the system comprising:

an encoder for encoding a plurality of bits at a physical layer with a secure error correcting code (SECC) to produce a plurality of encoded bits, the SECC having a set of defined characteristics that cause a bit error rate (BER) on the main channel to be lower than a first threshold BER value and cause a BER on the eavesdropper channel to be higher than a second threshold BER value when a distance between the eavesdropper device and the sender device is greater than the distance between receiver devices and the sender device, wherein the second threshold BER value is greater than the first threshold BER value; and a transmitter for transmitting the encoded plurality of bits on the main channel, wherein between receiver device and the sender device, the SECC has the set of defined characteristics such that when the eavesdropper device is more than a predetermined distance Z from the sender, a bit error probability on the eavesdropper channel does not exceed a predetermined security threshold while a bit error probability on the main channel does exceed a predetermined reliability threshold, the plurality of encoded bits including a fraction of unreliable bits which render the eavesdropper unable to reliably decode messages on the main channel.

7. The system of claim 6, wherein the main channel comprises a wireless channel.

8. The system of claim 6, wherein the SECC comprises a low density parity check code.

9. The system of claim 6, wherein the SECC comprises a turbo code.

10. A short range wireless communication device for securely communicating to a receiver device on a main channel when an eavesdropper device is listening on an eavesdropper channel, the system comprising:
   an encoder for encoding a message at a physical layer with a secure error correcting code (SECC) to produce an encoded message, the SECC having a set of defined characteristics that cause a bit error rate (BER) on the main channel to be lower than a first threshold BER value and cause a BER on the eavesdropper channel to be higher than a second threshold BER value when a distance between the eavesdropper device and the sender device is greater than the distance between receiver devices and the sender device, wherein the second threshold BER value is greater than the first threshold BER value; and
   a transmitter for transmitting the encoded message on the main channel, wherein
      the SECC has the set of defined characteristics such that-when the eavesdropper device is more than a predetermined distance Z from the sender, at least a predefined fraction of the message is unreliable, where the predefined fraction of unreliable bits renders the eavesdropper unable to reliably decode messages.

11. The short range wireless communication device of claim 10, wherein the main channel comprises a wireless channel.

12. The short range wireless communication device of claim 10, wherein the SECC comprises a low density parity check code.

13. The short range wireless communication device of claim 10, wherein the SECC comprises a turbo code.

14. The method of claim 1, wherein the main channel has an signal-to-noise ratio $SNR_M$, and the eavesdropper channel has a signal-to-noise ratio $SNR_E$.

15. The system of claim 6, wherein the main channel has an signal-to-noise ratio $SNR_M$, and the eavesdropper channel has a signal-to-noise ratio $SNR_E$.

16. The short range wireless communication device of claim 10, wherein the main channel has an signal-to-noise ratio $SNR_M$, and the eavesdropper channel has a signal-to-noise ratio $SNR_E$.

17. A method for securely receiving, a receiver device, a message from a sender device on a main channel when an eavesdropper device is listening on an eavesdropper channel, the method comprising:
   receiving an encoded message on the main channel; reproducing a secure error correcting code (SECC) used to generate the encoded message;
   decoding the encoded message using the SECC, the SECC having a set of defined characteristics that cause a bit error rate (BER) on the main channel is to be lower than a first threshold BER value and a BER on the eavesdropper channel is to be higher than a second threshold BER value when a distance between the eavesdropper device and the sender device is greater than the distance between receiver devices and the sender, wherein:
   the second threshold BER value is greater than the first threshold BER value, and
   the SECC has the set of defined characteristics such that when the eavesdropper device is more than a predetermined distance Z from the sender, at least a predefined fraction of the message is unreliable, where the predefined fraction of unreliable bits renders the eavesdropper unable to reliably decode messages.

18. The method of claim 17, wherein during a first time period, signal quality on the main channel is better than the signal quality on the eavesdropper channel.

19. The method of claim 17, wherein the decoding is performed at the physical layer of the receiver device.

20. The method of claim 17, wherein the main channel comprises a wireless channel.

21. The method of claim 17, wherein the SECC comprises a low density parity check code.

22. The method of claim 17, wherein the SECC comprises a turbo code.

23. The method of claim 17, wherein the main channel has an signal-to-noise ratio $SNR_M$, and the eavesdropper channel has a signal-to-noise ratio $SNR_E$.

* * * * *